United States Patent [19]

Nakano et al.

[11] Patent Number: 5,084,335
[45] Date of Patent: Jan. 28, 1992

[54] MAGNETIC RECORDING MEDIUM COMPRISING UPPER AND LOWER MAGNETIC LAYERS

[75] Inventors: Yasushi Nakano; Setsuko Kawahara, both of Hino; Kikuo Oonuma, Tamaho; Masahiro Umemura, Hino; Seiichi Tobisawa, Hino; Takeshi Nakajima, Hino, all of Japan

[73] Assignee: Konica Corporation, Tokyo, Japan

[21] Appl. No.: 407,337

[22] Filed: Sep. 14, 1989

[30] Foreign Application Priority Data

Sep. 19, 1988 [JP] Japan .................. 63-234488
Jul. 28, 1989 [JP] Japan .................. 1-197489

[51] Int. Cl.⁵ .............................. G11B 23/00
[52] U.S. Cl. ............................ 428/323; 428/328; 428/329; 428/330; 428/331; 428/332; 428/336; 428/423.3; 428/425.9; 428/424.6; 428/694
[58] Field of Search ............... 428/694, 900, 336, 323, 428/329, 425.9, 423.3, 332, 328, 330, 331, 424.6

[56] References Cited

U.S. PATENT DOCUMENTS

| | | | |
|---|---|---|---|
| 4,109,046 | 8/1978 | Hammon et al. | 428/216 |
| 4,323,621 | 4/1982 | Kober et al. | 428/216 |
| 4,506,000 | 3/1985 | Kubota et al. | 428/694 |
| 4,511,617 | 4/1985 | Hideyama et al. | 428/212 |
| 4,513,054 | 3/1985 | Kitamoto et al. | 428/329 |
| 4,670,337 | 6/1987 | Tokuoka et al. | 428/323 |
| 4,847,147 | 7/1989 | Aonuma | 428/329 |
| 4,946,740 | 8/1990 | Ono et al. | 428/323 |

FOREIGN PATENT DOCUMENTS 3418673  11/1985  Fed. Rep. of Germany.
3904068  8/1989   Fed. Rep. of Germany.

OTHER PUBLICATIONS

Patent Abstracts of Japan, vol. 9, No. 30 (P-333); 2/8/85, JPA 59-172142; 9/28/84.

Primary Examiner—Merrell C. Cashion, Jr.
Assistant Examiner—Stevan Resan
Attorney, Agent, or Firm—Jordan B. Bierman

[57] ABSTRACT

A magnetic recording medium improved in the magnetic recording characteristics, running properties and durability is disclosed. The magnetic recording medium comprises a non-magnetic support having on a side of the support an upper magnetic layer positioned farther from the support and a lower magnetic layer positioned closer to the support. The upper magnetic layer comprises a binder, a magnetic powder having an original BET specific surface area of not less than than 30 m²/g and at least one abrasive selected from alumina, silicon carbide, $Cr_2O_3$, silica, $\alpha$-$Fe_2O_3$, $TiO_2$ and zilconia in a portion of 3 to 20 parts per 100 parts by weight of the magnetic powder, and the lower magnetic layer comprises a binder and a magnetic powder having an original BET specific surface area of less than 30 m²/g, and kinds of the binders each contained in the upper magnetic layer and the lower magnetic layer are the same.

14 Claims, 5 Drawing Sheets

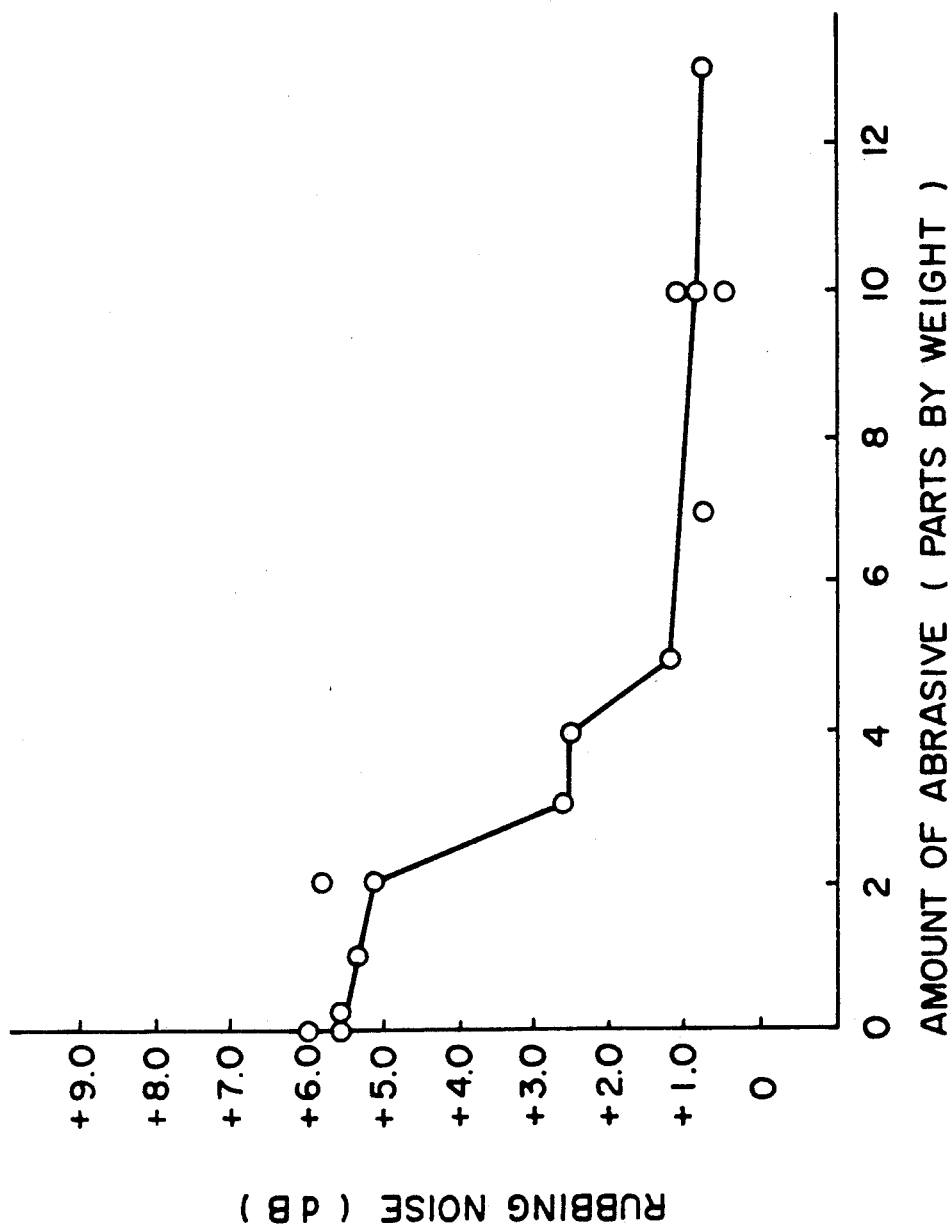

MAGNETIC RECORDING MEDIUM COMPRISING UPPER AND LOWER MAGNETIC LAYERS

FIELD OF THE INVENTION

The present invention relates to magnetic recording media such as a magnetic tape. a magnetic sheet, a magnetic disk.

BACKGROUND OF THE INVENTION

Magnetic recording media such as a magnetic tape are generally manufactured by a method of coating a magnetic paint comprising magnetic powder, binder, and resin on a base material, then drying it.

Recently, in the field of magnetic recording medium, especially in the field of magnetic medium for videorecording which is required to record a high frequency signal, a recording medium with a plurality of magnetic layers is proposed for the purpose of increasing magnetic recording capacity, and improving as well as balancing magnetic recording characteristics in both the high frequency and low frequency area. The examples are shown in Japanese Patent Publication Open to Public Inspection (hereinafter referred to as Japanese Patent O. P. I. Publication) Nos. 98803/1973, 172142/1984, Japanese Patent Examined Publication No. 2218/1957, Japanese Patent O. P. I. Publication No. 64901/1976, Japanese Patent Examined Publication No. 12937/1981.

However, the conventional techniques have not clearly disclosed the conditions to form an upper magnetic layer with good surface conditions on a lower magnetic layer, or the mutual relation of coating conditions of each layer in order to form magnetic layers with adequate surface conditions so that high output and a high S/N ratio can be obtained. Accordingly, some problems are caused as follows. The surface of a magnetic recording medium becomes too smooth like a mirror surface in some cases, so the rubbing noise of the tape in its runing is too loud. In some cases the surface of a magnetic recording medium is so rough that C/N ratio, a ratio of carrier to noise, is lowered.

In Japanese Patent O. P. I. Publication No. 66228/1983, on the other hand, it is disclosed that the reproducing output can be increased over all frequency bands from the low frequency band to the high frequency band by using of a magnetic powder having a BET value of 28 $m^2/g$ to 45 $m^2/g$, and that having a BET value of 18 $m^2/g$ to 25 $m^2/g$ in the upper and lower magnetic layer respectively. An example is disclosed in which the same binder is used in each of the upper and lower layers. When the same binder is used in each of the upper and lower layers, aggregation rarely occurs on the boundary between the two layers and affinity between the two layers is improved. As a result, the surface of the upper layer is improved.

Generally, the upper layer is thinner than the lower layer. The upper layer thickness is generally 0.6 $\mu$m to 1 $\mu$m and the lower layer thickness is 1.5 $\mu$m to 4 $\mu$m. The finished surface of the upper layer is subject to the surface conditions of the lower layer, therefore the upper layer surface tends to become rough, being affected by the lower layer. But in the case of a magnetic medium disclosed here. BET value of the magnetic powder in the upper layer is comparatively large and the surface area of the particles is large or, in other words, the particle size is small. Therefore, the surface of the upper layer becomes flat and smooth. In addition to that, the surface of the upper layer is further improved because the same binder is used in each of the upper and lower layers.

But in the case of the magnetic medium disclosed in the above-mentioned Japanese Patent O. P. I. Publication No. 66228/1983, abrasive is not contained in the magnetic layers, especially in the upper layer. For that reason, the surface conditions of the upper layer is improved. On the other hand, abrasive efficiency of the magnetic layer is low and the surface becomes smooth beyond necessity. For the reasons explained above, the rubbing noise became louder when the surface of the tape came into sliding contact with a magnetic recording head. Furthermore, it was proved that RF output, still frame durability and the electro-magnetic conversion characteristic of the medium were degraded. It was also proved that formation of chips of magnetic powder fallen at the time of slitting of the medium were increased, and these chips could be adhered to the surface of the medium to cause dropout. It is thought that the magnetic powder falling was caused by large BET value of the upper layer magnetic powder.

A magnetic medium which contains abrasive in both the upper magnetic layer and the lower one, is shown in Japanese Patent O. P. I. Publications No. 146211/1988 and No. 47228/1985. The medium have disadvantages as follows. The patent publications describe that 1 or 2 parts by weight of alumina per 100 parts by weight of magnetic powder is added into the upper layer and the lower layer of the medium. But it was proved that those were not sufficient to reduce the rubbing noise and to raise still frame durability and RF output of the medium. It is thought that the cause is not only the amount of aluminum but also the very thin magnetic upper layer of the medium. In other words, it is speculated that there exist particular problems which can not be predicted in case of recording medium having a thicker single magnetic layer. Any measure to solve such problems is not described in the above-mentioned publications at all.

SUMMARY OF THE INVENTION

It is an object of the present invention to provide a magnetic recording medium, which is, excellent in characteristics in terms of a rubbing noise, RF output and dropout, and has sufficient durability and adequate stiffness; and high productivity.

The above-mentioned object of the invention is attained by a magnetic recording medium comprising a non-magnetic support having on a side of the support an upper magnetic layer positioned farther from the support and a lower magnetic layer positioned closer to the support wherein the upper magnetic layer contains a magnetic powder having an original BET specific surface area of not less than 30 $m^2/g$ and at least one abrasive selected from alumina, silicon carbide, $Cr_2O_3$, silica, $\alpha$-$Fe_2O_3$, $TiO_2$ and zilconia in a portion of 3 to 20 parts per 100 parts by weight of the magnetic powder and a binder, the lower magnetic layer contains a magnetic powder having an original BET specific surface area of less than 30 $m^2/g$ and a binder, and kinds of the binders each contained in the upper magnetic layer and in the lower magnetic layer are the same.

In the above-mentioned, 'an original BET specific surface area', hereinafter referred to as simply 'a BET value', means a BET specific surface are of the magnetic powered before adding to a magnetic paint for making the magnetic layer.

BRIEF DESCRIPTION OF THE DRAWINGS

FIG. 8 is a graph which shows the change of the rubbing noise relating to the amount of the abrasive powder contained in the upper magnetic layer.

DETAILED DESCRIPTION OF THE INVENTION

Figure 1:
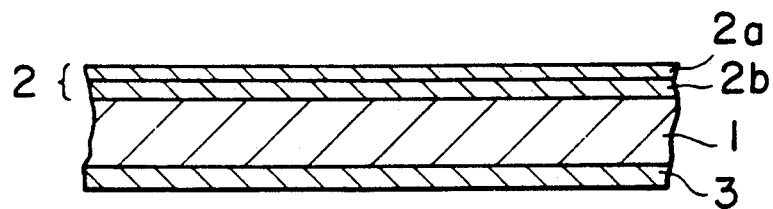
FIG. 1, FIG. 2, and FIG. 3 are sectional views of magnetic recording medium.

According to the present invention, it is possible to provide a magnetic recording medium which can record signals in high density and is excellent in the electromagnetic conversion characteristics, such as S/N ratio, output, in the high frequency area, by coating a plurality of magnetic layers on a support and by use of a magnetic powder having BET value of the specific surface area of not less than 30 m$^2$/g in the upper magnetic layer. In order to improve the advantageous effects, it is preferable to use the magnetic powder having a BET value not less than 4 $\mu$m$^2$/g, more . preferable not less than 50 m$^2$/g. The upper limit of the BET value should preferably be 70 m$^2$/g.

On the other hand, in the lower layer of the medium BET value of the magnetic powder is smaller than 30 m$^2$/g and the particle size is comparatively large, therefore the electromagnetic conversion characteristic is improved especially in the low frequency area and Young's modulus of the lower layer is improved, and this leads to increasing the stiffness of the whole magnetic layers. In addition to that, the the magnetic powder of the lower layer can be dispersed uniformly in the layer because the particle size of the powder is comparatively large. Therefore, output of the medium is increased and the surface of the upper layer can be controlled easily when this type of lower layer is used. BET value of the magnetic powder of the lower layer is preferably 20 m$^2$/g to 29 m$^2$/g and more preferably 25 m$^2$/g to 29 m$^2$/g.

In the present invention, it is preferable that the length of the average major axis of the upper layer magnetic powder is 0.10 $\mu$m to 0.25 $\mu$m and that of the lower layer magnetic powder is 0.25 $\mu$m to 0.40 $\mu$m. It is also preferable that the ratio of the major axis length to the minor axis length of the upper layer magnetic powder is 7 to 9 and that of the lower layer magnetic powder is 9 to 12.

According to the invention, each of the upper magnetic layer and the lower magnetic layer is bound by the same kind of binder. Accordingly, aggregation of magnetic paints is not caused on the boundary between the layers and affinity between the two layers is improved. For that reason, it becomes easy to coat the upper layer after the lower layer was coated and productivity of the magnetic recording medium is improved. It is thought that the reason for the improvement is that the upper layer get to fit well the lower layer. The composition of the magnetic recording medium of the present invention is adequate for the wet-on-wet multilayer coating method by which the upper layer is coated on the wet lower layer. It is also adequate for the wet-on-dry multilayer coating method by which the upper layer is coated on the dried lower layer.

As explained above, in this invention, the surface conditions of the upper layer are improved by keeping BET value of the upper layer magnetic powder to be at 30 m$^2$/g or more and that of the lower layer magnetic powder to be smaller than 30 m$^2$/g, and using the same kind of binder for both upper and lower layers. The reasons why the upper surface conditions are improved are thought as follows. BET value of the lower layer magnetic powder is comparatively small and the boundary surface between the upper and lower layers tends to become rough. But the undesirable influence on the upper layer surface can be reduced by increasing BET value of magnetic powder in the upper layer. Furthermore, the boundary conditions between the upper layer and the lower layer are improved by using the same kind of binder for both layers. The stiffness of the lower layer is increased by using a magnetic powder having the specific BET value in the lower magnetic layer. As a result, Young's modulus of the recording medium is increased, so the fitness for slitting operation of it is improved. Furthermore, dropout is decreased because the binding strength between the upper layer and the lower layer is improved due to the same kind of binder used for both layers.

According to the present invention, the foregoing abrasive alumina or the like is contained in the ratio of 3 to 20 parts per 100 parts by weight of the magnetic powder. But the reduction of the rubbing noise and the improvement of the electromagnetic conversion characteristics can not be obtained simply because the abrasive is added to the upper layer. The objects of the invention can be attained not only by the abrasive in the upper layer but also by other components of the present invention such as limitation of BET values of magnetic powders each used for the upper and lower layer and the use of the same kind of binder for both of the upper layer and the lower layer. In other words, the object of the invention can be attained by a synergistic effect of these components of the invention. In a case of a magnetic recording medium which has a plurality of magnetic layers as in the present invention, it is necessary to improve the surface conditions of the upper layer by increasing BET value of the upper layer magnetic powder and bettering affinity between the upper layer and the lower layer in order to improve frequency characteristics and electromagnetic conversion characteristics of the recording medium. But the surface of the upper layer obtained in this way tends to become too smooth. In the present invention, not less than 3 parts by weight of abrasive powder is added to the upper layer in order to make the upper surface conditions proper and to give the adequate grinding capacity to the upper layer. A large amount of abrasive to be contained in the layer of the invention is considerably large comparing with a conventional magnetic recording medium. In view of conventional technology, the fact is quite unexpected that such a large amount of abrasive is used in the layer to obtain a magnetic recording medium with excellent magnetic recording characteristics. In the present invention, the rubbing noise can be reduced to a great extent by adding not less than 3 parts by weight of abrasive, preferably not less than 5 parts by weight, to the layer in spite of using magnetic powder having high BET value in order to improve electromagnetic conversion efficiency. Since the upper layer is thin, the amount of abrasive per unit volume can be kept sufficient for enhancing the abrasion effect. When more than 20 parts by weight of abrasive is added, it is too much, so the electromagnetic conversion characteristic is degraded and the strength of the layer is decreased. It is preferable to determine the amount of abrasive to be not more than 20 parts by weight. It is further preferable to keep the amount of abrasive in the range of 5 to 15 parts by weight. When the abrasive is used on the conditions mentioned above, cleaning effect of a magnetic recording medium is improved.

On the other hand, when BET value of magnetic powder used in the upper layer is relatively large as not less than 30 m$^2$/g, generally speaking, dropout tends to occur as the magnetic powder falls from the layer during the slitting operation. In the present invention, the upper layer contains the above-mentioned abrasive to a specific extent and the binding strength between the upper layer and the lower layer is strong. As a result, the shavings produced or fallen magnetic powder during the slitting operation are remarkably reduced and dropout caused by the shavings attached to the recording medium is considerably decreased.

According to the present invention, at least the upper magnetic layer contains at least one of substances described below as the abrasive. They are alumina including α-alumina and γ-alumina, silicon carbide, chromium oxide ($Cr_2O_3$). silica, α-$Fe_2O_3$, $TiO_2$, and zirconia. Those abrasives can either be contained in the lower layer or not. In case that the abrasive is contained in the lower layer, it is preferable to add not less than 10 parts per 100 parts by weight of magnetic powder in the lower layer. The smaller the amount of the abrasive contained in the lower layer, the less the surface of the upper layer is affected and the more electromagnetic conversion characteristics are improved. The average particle size of the abrasive contained in the upper layer is preferably not more than 0.6 μm and further preferably not more than 0.3 μm. The average particle size is defined as the average major axis length of 100 abrasive particles.

In this invention, the upper layer and the lower layer which are composed of the magnetic layers, preferably adjoin with each other. The boundary between the upper layer and the lower layer will be explained as follows. For example, in case that the boundary having thickness of 0.1 μm to 0.3 μm, in which two types of magnetic powder each added to the upper and lower layers—BET value of one is not less than 30 m$^2$/g and that of the other is smaller than 30 m$^2$/g—are present as a mixture, is formed between the upper and lower layers, this boundary is considered to belong to neither the upper layer nor the lower layer. Accordingly, the portion above the boundary is defined as the upper layer and the portion under the boundary is defined as the lower layer. A case in which such an obscure boundary does not exist, in other words a case in which there exists a clear boundary between the upper layer and the lower layer, is also included in the present invention.

In the present invention, foregoing BET value is the surface area per unit weight of the powder and it is a kind of physical quantity which is quite different from the average particle size. For instance, there exist some cases in which the specific surface of magnetic powder is different from each other even if their average particle size of the powder is the same. One of the examples to measure the specific surface will be described as follows. The powder to be measured is deaerated while it is heated at the temperature of approximately 250° C. for 30 to 60 min, and the substance absorbed in the powder is removed. After that, the powder is put into a measuring apparatus and the initial nitrogen pressure is set to 0.5 kg/m$^2$ to conduct absorption measurement with nitrogen at the liquid nitrogen temperature of $-195°$ C. The specific surface area measurement method Which is generally Called B.E.T. Method; refer to J. Ame. Chem. Soc. 60 309(1938) for more details. "Bulk Material Measurement Device" (Quantasorb) jointly manufactured by Yuasa Battery Company and Yuasa Ionics Company can be used to measure the specific surface or BET value. Genaral explanation about the specific surface area and its measurement is described in detail in "Measurement of Particle" by J. M. DALLAVALLE, under joint authorship of CLYDEORR Jr, translated by Muta and others; published by Sangyo Tosho Sha Company. It is also described in "Chemistry Handbook" (Applied Chapter, page 1170 to page 1171, by Japan Chemistry Academy, published by Maruzen Company on Apr. 30, 1966). Although the specific surface area is simply mentioned as the surface area (m$^2$/gr) in the above-mentioned Chemistry Handbook, it is the same as the specific surface area in this specification.

In the present invention, the sentence saying that binders are the 'same kind', means in a case of addition polymer, that monomers which compose of polymers used as binders respectively in the upper layer and the lower layer are the same. In a case of condensation polymer, bonds for instance urethane bond or ester bond contained in polymers which are used as binders in the upper layer and the lower layer, are the same. Even if the degree of polymerization is different from each other, they are defined as the 'same kind'. In a case of copolymer which consists of a plurality of monomers, when monomers are the same, binders are defined as the 'same kind' even if the inclusion ratio of these monomers is different from each other. In a case binder is hardened by a hardening agent, it is a necessary condition of being the 'same kind' that both binders contain the hardening agent. Even if monomers are the same, when one binder contains a hardening agent and the other binder does not contain it, the binders are not regarded as the same kind. When both binders do not contain a hardening agent, the binders are the 'same kind' when monomers or bonds are the same.

When using a binder in which a plurality of polymers are mixed, it is a necessary condition of being the 'same kind' of binder that a plurality of polymers contained in the upper layer and the lower layer are the same, satisfying the conditions mentioned above. But the mixing ratio of them can differ between the upper layer and the lower layer.

Referring now in detail to concrete examples, the meaning of the phrase saying that 'binders are of the same type' will be explained as follows.

(1) For example, in a case of the kind of polyurethanes, even when they differ in Tg (glass transition point) and molecular weight (Mw, Mn), they are regarded as the same type.

(2) In a case of the kind of polyurethanes, even when they differ in their compositions such as diisocyanate in which tolylene diisocyanate, 4,4-diphenyl methan diisocyante, isophorone diisocyanate and hexamethylene diisocyanate are included, polyol, and glycol or they differ in their composition ratio, they are regarded as the same type as far as they have urethane bonds.

(3) Even when resin is modulated with functional or polar groups in it or not, urathanes are regarded as the same kind. The following functional groups are such examples as to explain the above-mentioned case.

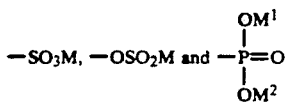

In the formulae. M is a hydrogen atom, lithium or sodium. $M^2$ and $M^2$ are each a hydrogen atom, lithium, potassium, sodium atom, or an alkyl group. $M^1$ and $M^2$ can be different from each other or the same.

An example will be given as follows concerning the above-mentioned (1), (2), and (3). Polyurethane resins UR8300 and N313Z used in Example 2 which will be explained later, are defined as the same kind. The details are as follows.

|  | UR8300 | N3132 |
|---|---|---|
| Tg | +22° C. | −20° C. |
| Mw | 40000 | 70000 |
| Component | MDI/NPG/PCL | MDI/1,4-BG/ADA |
| Polar group | —SO₃M | None |

(Remarks)
MDI: Methylene diisocyanate
NPG: Neopentylglycol
PCL: Polycaprolacton
1, 4-BG: 1, 4-butanediol
ADA: Adipic acid (4) In a case of polyvinyl chloride resin and polyvinyl chloride-vinyl acetate copolymer, they obviously are not regarded as the same kind. The reason is that homopolymer and copolymer greatly differ in physical property even though the polymer composing component or monomer is common between the two.

(5) For example, in a case that polyvinyl chloride resin and polyurethane are contained in the upper layer and polyvinyl chloride resin is not contained in the lower layer, it can be said they are not the same kind. In order to be the same kind, it is necessary for the lower layer to contain the same kind of resins as the resins contained in the upper layer. In a case that mixtures of two kinds of resins, A and B, are used together, they are regarded to be the same kind even though the upper layer and the lower layer differ in the mixing ratio, for example as shown in the following table.

|  | A | B |
|---|---|---|
| Upper layer | 80 parts | 20 parts |
| Lower layer | 20 parts | 80 parts |

Another example of using two or more kinds of resins together is a combination of polyurethane and other resins. In this case, other resins preferably are polyvinyl chloride, epoxy resin particularly phenoxy resin, polyester resin or nitrocellulose resin. Hereinafter the above-mentioned resins are referred as other resins. Concerning the compounding ratio of the above-mentioned urethane resins to other resins is preferably 90 to 10 parts by weight of other resins are preferable and 80 to 20 parts by weight of other resins are more preferable. When the mixing ratio of other resins exceeds 90 parts by weight, the coated layer becomes too fragile, its durability is degraded, and adhesion between the coated layer and its support becomes weak. When the compounding ratio of other resins is smaller than 10 parts by weight, magnetic powder tends to peel from the layer.

The definition that the binders are the same kind is explained above. When the present invention is put into practice, it is preferable that the same kinds of binders used in the upper layer and the lower layer are selected to be similar to each other in terms of solvent solubility of binders, surface tension and viscosity of the coating solution containing the binder, and drying rate of the coating solution after being coated.

The binders used in both the upper layer and the lower layer are preferably chosen from the following (1), (2), and (3). When the binder to be used in the upper layer is chosen from (1), it is preferable that the binder to be used in the lower layer is also chosen from (1). This applies also to the occasion when the binder to be used is chosen from (2) or (3).

(1) Polyurethane resin + Polyvinyl chloride resin
(2) Polyurethane resin + Polyvinyl chloride − vinyl acetate resin
(3) Polyurethane resin + Polyvinyl chloride resin + - Polyvinyl chloride − vinyl acetate resin In the present invention, magnetic powders used in the magnetic layer are ferrous oxide magnetic powder such as $\gamma$-$Fe_2O_3$, co-containing $\gamma$-$Fe_2O_3$, $Fe_3O_4$, co-containing $Fe_3O_4$, $FeOx(4/3 \leq x \leq 3/2)$, and various kinds of ferromagnetic powder such as $CrO_2$.

Furthermore the following magnetic metal powders can be used in the present invention. They are ferromagnetic powders such as metal magnetic powders of Fe, Ni, Co, Fe-Al, Fe-Al-Ni, Fe-Al-Co, Fe-Al-Zn, Fe-Ni-Co, Fe-Mn-Zn, Fe-Ni, Fe-Ni-Al, Fe-Ni-Zn, Fe-Co-Ni-Cr, Fe-Co-Ni-P, Co-Ni. Iron magnetic metal powders which contain Fe of not less than 80 atm % furthermore not less than 90 atm %, are excellent in electric characteristics. Magnetic metal powders such as Fe-Al, Fe-Al-Ni, Fe-Al-Zn, Fe-Al-Co, Fe-Ni, Fe-Ni-Al, and Fe-Ni-Zn group, are preferable in terms of anticorrosion and dispersibility.

Furthermore, Iron-Aluminum magnetic metal powders such as Fe-Al, Fe-Al-Ni, Fe-Al-Zn, Fe-Al-Co are especially preferable.

Recently, a video recording tape has various uses with the progress of a portable machine. As a result, video tapes are used under various conditions. Accordingly, high anticorrosion is required to a video tape. Fe-Al series magnetic powder has high anticorrosion and is excellent in dispersibility. This fact is very important to realize high density recording, since dispersibility of magnetic powder can be sufficient for recording even though the magnetic powder has the large specific surface area.

In a case of the above-mentioned Fe-Al series magnetic metal powder, it is preferable that the aluminum content in the magnetic powder is kept in the range of 0.1 to 20 atomic %.

A binder or resin which is used in the present invention is preferably composed of modified resin which has at least one of polar groups which will be described below. But it is also allowed to have no polar group.

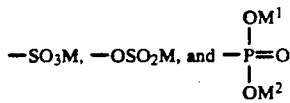

In the formulas, M is a hydrogen atom, lithium atom, or sodium atom, $M^1$ and $M^2$ are each a hydrogen atom, lithium atom, potassium atom, sodium atom, or an alkyl group. $M^1$ and $M^2$ can be different from or the same with each other.

There are various kinds of methods to modify the resins. For example, polyester resin which contains metal sulphonate groups, can be obtained by using dicarboxylic acid which contains metal sulphonate group as a part of dicarboxylic acid. The above-mentioned dicarboxylic acid and dicarboxylic acid which does not have metal sulphonate group, are condensed together with diol to prepare the modified resin.

Polyester polyurethane resin which contains metal sulphonate groups, can be obtained by condensation reaction and addition reaction with three kinds of chemicals such as dicarboxylic acid which contains metal sulphonate group, dicarboxylic acid which does not contain metal sulphonate group, and diol and diisocyanate. In a case of polyurethane, urethane resin can be synthesized by introducing metal sulphonate group to diol.

A method wherein polyester resin, polyurethane resin, and vinyl chloride resin are modified with introduce polar group can also be considered. Details of this method will be explained as follows.

The above-mentioned resins and the chemicals such as

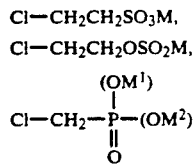

which contain polar groups and chlorine in molecules, are condensed by dehydrochlorizating reaction. In the above-mentioned formulas, the meanings of M, $M^1$, and $M^2$ are the same as explained before.

Carboxylic acid elements to be used in order to obtain polyester resin and polyurethane resin are terephthalic acid, isophthalic acid, orthophthalic acid, aromatic dicarboxylic acid such as 1, 5-naphthalic acid; aromatic hydroxy carboxylic acid such as p-oxybenzoic acid, p-(hydroxy ethoxy) benzoic acid; aliphatic dicarboxylic acid such as succinic acid, adipic acid, azelaic acid, sebacic acid, dodecane dicarboxylic acid; tri and tetracarboxylic acid such as trimelitic acid, trimesic acid, pyromellitic acid.

It is preferable to use terephthalic acid, isophthalic acid, adipic acid, and sebacic acid.

Dicarboxylic acid components which contain metal sulfonate group are, for instance, sodium 5-sulfoisophthalate, potassium 5-sulfoisophthalate, sodium 2-sulfoterephthalate, and potassium 2-sulfoterephthalate.

As a diol component mentioned above, there may be given, as examples, ethylene glycol, propyrene glycol, 1,3-propanediol, 1,4-butanediol, 1,5-pentanediol, 1,6-hexanediol, neopentyl glycol, diethylene glycol, dipropyrene glycol, 2,2,4-trimethyl-1,3-neopentanediol 1,4-cyclohexanedimethanol, ethyleneoxide addition product of bisphenol A, ethyleneoxide addition product of hydrogenated bisphenol A, polyethylene glycol, polypropyrene glycol, polytetramethylene glycol. Further, a triol and/or a tetraol such as trimethylolethane, trimethylolpropane, glyceline, pentaerythritol may also be used together.

As the aforesaid isocyanate component to be used for obtaining polyurethane resin, there may be given, as examples, 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4, 4'-biphenylenediisocyanate, 4,4,-diisocyanate-diphenylether, 1,3-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatedicyclohexylmethane, isophoronediisocyanate.

Figure 2:
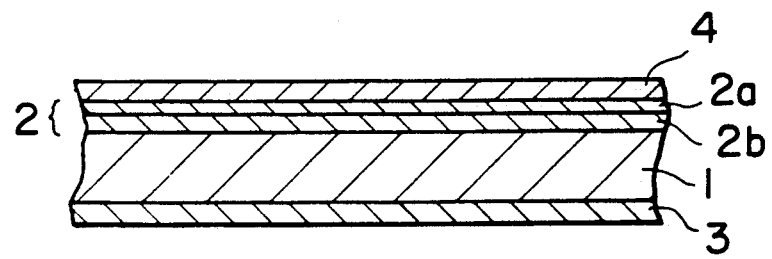
Figure 3:
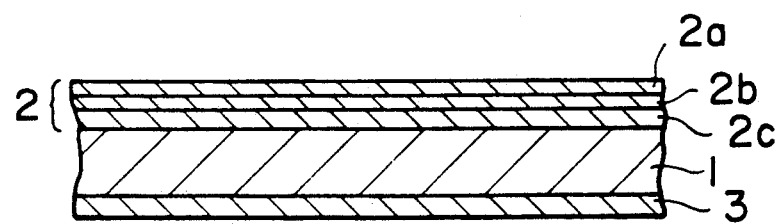

A magnetic recording medium of the invention is of a type wherein there is provided magnetic layer 2 comprising upper layer 2a and lower layer 2b on non-magnetic support 1 such as polyethyleneterephthalate, and there is further provided, if necessary, BC layer 3 on the surface opposite to magnetic layer 2 on the support, as shown in FIG. 1. As shown in FIG. 2, over coat layer (OC layer) 4 may further be provided on magnetic layer 2 of the magnetic recording medium in FIG. 1. Further, as shown in FIG. 3, magnetic layer 2 may comprise two or more layers, for example, of upper layer 2a, interlayer 2b and lower layer 2c. In this case, however, upper layer 2a and interlayer 2b correspond to the upper layer and the lower layer of the invention respectively, and lower layer 2c may be of a different composition.

Each of magnetic recording media shown in FIGS. 1-3 may or may not be provided with a sublayer not illustrated between magnetic layer 2 and support 1, and support 1 may be given corona discharge processing.

Besides, when it is a magnetic disk, magnetic layers 2 can be formed on both surfaces of support 1.

Further explanation will be given about magnetic layer 2 according to the present invention it is preferable that BET values of magnetic powders for the upper layer and the lower layer are each set to be not less than 30 m$^2$/g and less than 30 m$^2$/g, respectively and the same kind of binder is used, and further the characteristic values are set as following.

When coercive force (Hc) of the upper layer 2a is not less than 700 Oe and not more than 2000 Oe, the recording capacity is increased. As for lower layer 2b, it is preferable that Hc is set to be less than 800 Oe and not less than 600 Oe, and more preferable to be from 650 to 750 Oe.

Besides, it is preferable that the residual magnetic flux density (Br) of the upper layer 2a is set to be from 1400 to 1600 gausses, and that of the lower layer 2b is set to be from 1000 to 1400 gausses.

Furthermore, the coating thickness or layer thickness of upper layer 2a is preferably not more than 1.0 μm, especially, from 0.3 to 1.0 μm, and that of lower layer 2b is preferably from 1.5 to 4.0 μm, especially, from 2.0 to 3.5 μm.

In addition to the aforesaid magnetic powder and binding agent, a fatty acid and/or fatty acid ester may be contained as a lubricant in at least upper layer 2a of magnetic layer 2. Such fatty acids may be of either the monobasic type or the dibasic, however, they should have preferably 6 to 30 carbon atoms and, more preferably, 12 to 22 carbon atoms.

Such fatty acids may be exemplified as follows.

| | |
|---|---|
| 1) caproic acid | 2) caprylic acid |
| 3) capric acid | 4) lauric acid |
| 5) myristic acid | 6) palmitic acid |
| 7) stearic acid | 8) isostearic acid |
| 9) linolenic acid | 10) linolic acid |
| 11) oleic acid | 12) elaidic acid |
| 13) behenic acid | 14) malonic acid |
| 15) succinic acid | 16) maleic acid |
| 17) glutaric acid | 18) adipic acid |
| 19) pimelic acid | 20) azelaic acid |
| 21) sebacic acid | |
| 22) 1,12-dodecane dicarboxylic acid, and | |
| 23) octanedicarboxylic acid | |

The fatty acid esters may be exemplified as follows.

| | |
|---|---|
| 1) oleyl oleate | 2) oleyl stearate |
| 3) isocetyl stearate | 4) dioleyl maleate |
| 5) butyl stearate | 6) butyl palmitate |
| 7) butyl myristate | 8) octyl myristate |
| 9) octyl palmitate | 10) amyl stearate |
| 11) amyl palmitate | 12) isobutyl oleate |
| 13) stearyl stearate | 14) lauryl oleate |
| 15) octyl oleate | 16) isobutyl oleate |
| 17) ethyl oleate | 18) isotridecyl oleate |
| 19) 2-ethylhexylmyristate | 20) 2-ethylhexylmyristate |
| 21) ethyl stearate | 22) 2-ethylhexyl palmitate |
| 23) isopropyl palmitate | 24) isopropyl myrstate |
| 25) butyl laurate | 26) cetyl-2-ethyl hexarate |
| 27) dioleyl adipate | 28) diethyl adipate |
| 29) diisobutyl adipate | 30) diisodecyl adipate |

When a fatty acid and a fatty acid ester such as above-mentioned ones are used together, it is possible to offset the defects caused in the case of a single application so as to improve the lubrication effects and to enhance a still-frame durability, running stability, S/N ratio and so forth, while displaying every special feature of both additives. In this case, a fatty acid may be added in an amount within the range of 0.2 to 10 parts by weight per 100 parts by weight of magnetic powder used and, preferably, 0.5 to 8.0 parts by weight. If an amount of fatty acid added is smaller to be out of the above-mentioned range, the dispersibility of magnetic powder is lowered and the runnability of a medium is apt to be lowered. If exceeding the range, fatty acid may ooze out or an output is apt to be lowered. On the other hand, an amount of fatty acid esters added may be within the range of 0.1 to 10 parts by weight to 100 parts by weight of magnetic powder and, more preferably, 0.2 to 8.5 parts by weight. If an amount of the esters added is smaller to be out of the above-mentioned range, the effect of the runnability improvement is little. If exceeding the range, the esters may ooze out and an output is apt to be lowered.

From the viewpoint of making the above-mentioned effects more excellent, a weight-ratio of a fatty acid to a fatty acid ester should preferably be within the range of a fatty acid/a fatty acid ester = 10/90 to 90/10. Further, such fatty acids may be able to display an effect of a dispersing function. It may, therefore, be considered that an amount of other low molecular-weight dispersant may be reduced by making use of the fatty acid so as to improve the Young's modulus of a magnetic recording medium as much as such a reduction of the other low molecular weight dispersant used.

Besides, the above-given fatty acids and fatty acid esters, other types of lubricants including, for example, silicone-oil which may be of the carboxylic acid-modified type or of the ester-modified type, graphite, fluorocarbon, molybdenum disulfide, tungsten disulfide, fatty acid amide, α-plefin oxide, may also be added to a magnetic layer.

It is also allowed to add an antistatic agent such as graphite, and a dipersant such as powdered lecithin or a phosphoric acid ester into a magnetic layer and, further, carbon black may also be used in combination. It is effective for the reduction of the friction coefficient and the reduction of rubbing noise to add to the upper layer of the magnetic layer the carbon black with a medium or greater particle size whose diameter is 20–300 mμ in the proportion of 0.1–15 parts by weight preferably, and more preferably in the proportion of 0.1–7 parts by weight to one part of the magnetic powder. On the lower layer of the magnetic layer, it is effective for the light-shielding, electroconductivity, an improvement of smooth running and for the decrease of dropout to add thereto the carbon black with a small particle size whose diameter is 10–70 mμ in the proportion of 3–20 parts by weight preferably, and more preferably in the proportion of 3–15 parts by weight to one part of the magnetic powder.

Such light-shielding carbon blacks applicable to this purpose include, for example, Raven 2000 having a specific surface are of 190 $m^2/g$ and a particle size of 18 mμ, 2100, 1170 and 1000 all manufactured by Columbia Carbon Company. and #100, #75, #40, #35, #30 and so forth each manufactured by Mitsubishi Chemical Industrial Company.

Conductive carbon blacks include, for example, Conductex 975 having a BET value (hereinafter simply called BET) of 250 $m^2/g$, a DBP oil-absorption (hereinafter simply called DBP) of 170 ml/100 gr, and a particle size of 24 mμ, Conductex 900 having BET of 125 $m^2/g$ and a particle size of 27 mμ, Conductex 40–220 having a particle size of 20 mμ, and Conductex SC having BET of 220 $m^2/g$, DBP of 115 ml/100 g, and a particle size of 20 mμ, each manufactured by Columbian Carbon Company, Vulcan (Cabot Vulcan) XC-72 having a specific surface area of 254 $m^2/g$ and a particle size of 30 mμ, and Vulcan P having a BET of 143 $m^2/g$, a DBP of 118 ml/100 g, and a particle size of 20 mμ, each manufactured by Cabot Company, Raven 1040, 420, each manufactured by Cabot Company and Black-Pearls 2000 (BET 1475 $m^2/g$, DBP 330 ml/100 g, and having a particle size of 15 mμ), and #44 manufactured by Mitsubishi Chemical Industrial Company, having a particle size of 15 mμ.

Other carbon blacks applicable to the invention include, for example, Vulcan 9 having a BET of 140 $m^2/g$, a DBP of 114 ml/100 g and a particle size of 19 mμ, manufactured by Cabot Company, #80 having a BET of 117 $m^2/g$, a DBP of 113 ml/100 g and a particle size of 23 mμ, manufactured by Asahi Carbon Company HS-100 having a BET of 32 $m^2/g$, a DBP of 180 ml/100 g, and a particle size of 53 mμ, manufactured by Denki Kagaku Company. #22B having a BET of 55 $m^2/g$. a DBP of 131 ml/100 g and a particle size of 40 mμ, #20B having a BET of 56 $m^2/g$, a DBP of 115 ml/100 g and a particle size of 40 mμ, and #3500 having a BET of 47 m²/g, a DBP of 187 ml/100 g and a particle size of 40 mμ, each manufactured by Mitsubishi Chemical Industrial Company and besides the above, CF-9, #4000, and MA-600, each manufactured by Mitsubishi Chemical Industrial Company, Black Pearls L, Monarck 800, Black Pearls 700, Black Pearls 1000, Black Pearls 880, Black Pearls 900, Black Pearls 1300 and Black Pearls 2000 and Sterling V, each manufactured by Cabot Company, Raven 410, Raven 3200, Raven 430, Raven 450, Raven 825, Raven 1255, Raven 1035, Raven 1000, Raven 5000, each manufactured by Columbian Carbon Company, and Ketchen Black FC.

It is more preferable when a back-coat layer contains non-magnetic particles having an average particle size within the range of 10 mμ to 1000 mμ, because they are not so finely powdered but can display an excellent addition effect, when their particle size is within the above-mentioned range.

Such non-magnetic particles include, for example, those of silicon oxide, titanium oxide, aluminum oxide, chromium oxide, silicon carbide, magnesium hydroxide, zinc oxide, $\alpha$-$Fe_2O_3$, talc, kaolin, calcium sulfate, boron nitride, zinc fluoride, molybdenum dioxide, calcium carbonate, and barium sulfate. In addition to the above, organic powder such as benzoguanamine type resins, melamine type resins, and phthalocyanine type resins, may also be used. Further, such organic powder and the foregoing inorganic powders may be used in combination.

It is further preferable to use carbon black together with the above-mentioned non-magnetic particles. If this is the case, the runnability of a medium may further be stabilized and the durability of the medium can further be improved by the combination with the functions of the non-magnetic particles.

A material usable as a non-magnetic support 1 may include polyester such as polyethylene terephthalate, polypropyrene cellulose derivatives such as cellulose triacetate, cellulose diacetate, cellulose acetate bytylate, cellulose acetate propionate polycarbonate, polyvinyl chloride, polyimide, polyhydrazide group, metal (for example, aluminum, copper), paper and so forth.

As a method to coat magnetic coating onto the non-magnetic support, the blade coating method, the reverse roll coating method, the gravure coating method, the spray coating method, the cast coating method, the air doctor coating method, the air knife coating method and so forth are given as an example. Actually, they are mentioned on pages 253-277 in 'Coating Technology' (published by Asakura Shoten in 1971).

Besides, in the present invention, it is possible to improve durability by adding polyisocyanate type hardener to magnetic coating which contains a binder.

Figure 4:
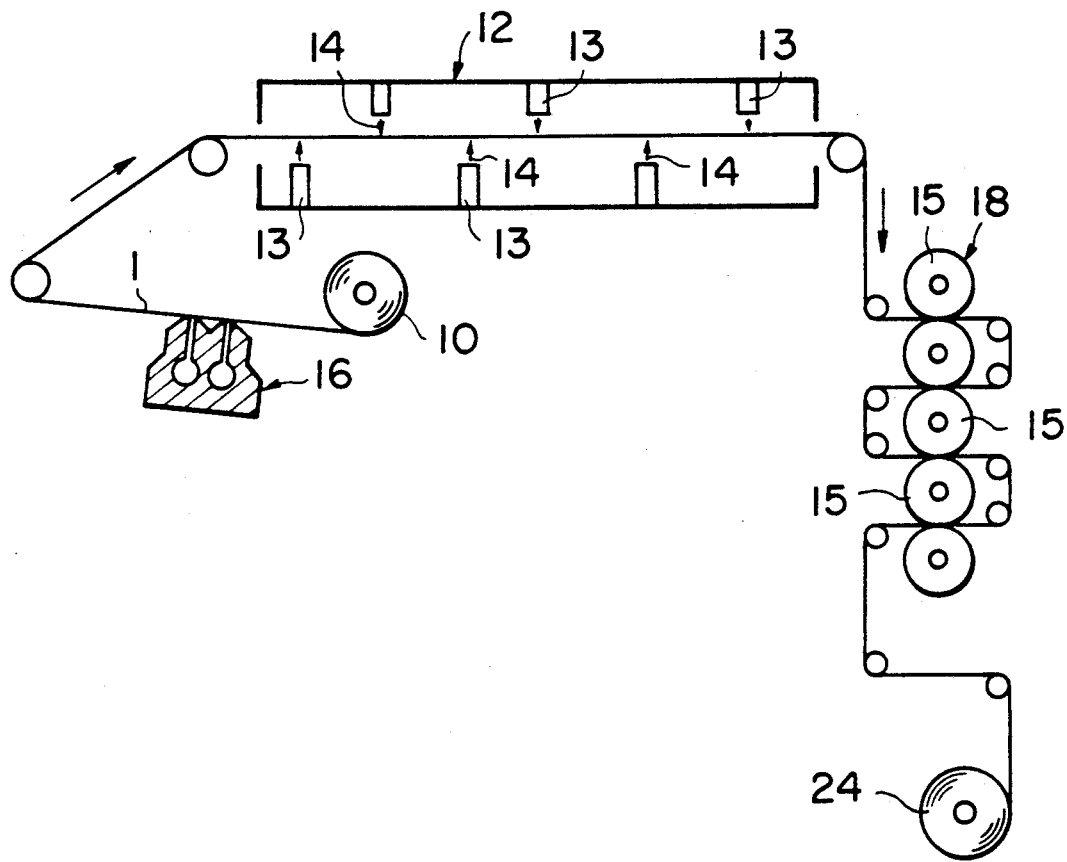
FIG. 4 is a schematic illustration which shows the manufacturing process of the medium.
Figure 5:
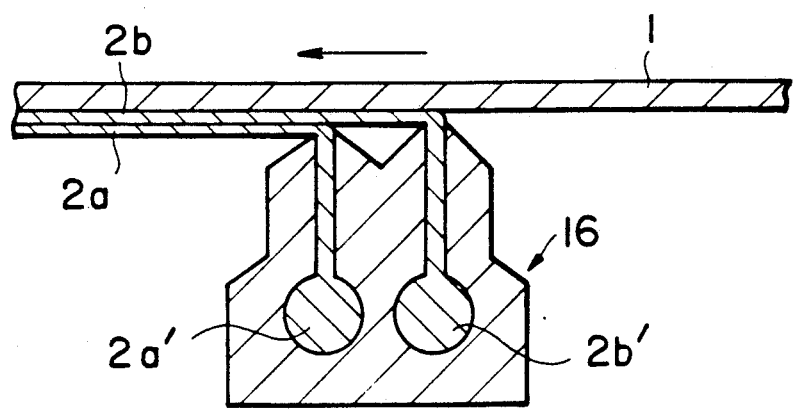
FIG. 5 is a schematic sectional view of the extrusion coater.

FIGS. 4 and 5 are schematic diagrams illustrating the manufacturing method of magnetic recording media such as, for example, magnetic tapes.

Magnetic recording media are normally manufactured through the steps wherein magnetic paint which contains magnetic powder is coated on a base film, the coating is dried, and then the base film with magnetic layer is subjected to the calendering process while it is pressurized and heated so that the magnetic layer surface may be smoothed. These steps will be explained as follows, referring to FIG. 4 film type support 1 fed from supply roll 10 is coated With magnetic paint by means of a multi-layer simultaneous coating conducted by the extrusion coater 16, to have thereon two magnetic layers, and then is conveyed to drier 12 where it is dried by hot air 14 jetting from nozzles 13 arranged at both upper and lower sides. Then, dried support 1 with magnetic layers is conveyed to the calender part 18, which is a combination of calender rolls 15, so as to be calendered. Then, it is wound round the take-up roll 24. Incidentally, the magnetic coating to be supplied to the extrusion coater 16 can be supplied through the in-line mixer (which is not illustrated here).

Extrusion coater 16 is composed as shown in FIG. 5. In the coater, two kinds of magnetic coatings $2a'$ and $2b'$ can be extruded from one head almost simultaneously. So, immediately after coating the first magnetic layer $2b$ namely, before the first layer is dried, the second layer $2a$ is coated on the first layer. In this case, it is very important as stated above to make an arrangement that the same kind of binder is used for both magnetic coatings, the BET value of the magnetic powder for $2a$ is not less than 30 m²/g and that for $2b$ is less than 30 m²/g. This is an indispensable condition for multi-layer coating for $2b$ and $2a$ as shown, in FIG. 5. And, a small BET value of the magnetic powder in $2b$ contributes to the excellent dispersibility in $2b'$, resulting in the excellent surface smoothness of $2a$.

In place of single coater 16 in the above case, it is further possible to use two heads provided separately, one is for the first layer $2b$ and the other for the second layer $2a$. The first layer $2b$ is not necessarily be coated by the extrusion coater, but it is preferable from the productivity viewpoint that the second layer $2a$ is coated by the extrusion coater.

Further, the magnetic layer may have 3 or more layers in addition to the above-mentioned two-layer structure. But in any case, based on the present invention, BET values of the magnetic powder and the kinds of binder in the upper layer side and the lower layer side, preferably adjoining each other, are to be selected.

EXAMPLES

Now, some examples of the invention will be detailed.

It is to be understood that the following components, proportions, operating orders, and so forth mentioned herein may variously be changed within the scope that such changes shall not deviate from the spirit of the invention. In the following examples, the term, 'part(s), herein means 'part(s) by weight'. Further, 'Ex.' means Example and 'Comp. Ex.' means Comparative example.

Magnetic coatings shown in the following Tables 1A to 1Z' were prepared, and coated through the multi-layer simultaneous coating on a polyethylene terephthalate base by an extrusion coater. Then, the coated base was dried, calendered (80° C., 70 kg/cm²), wound and cured (70° C., 20 hours).

The wide film thus prepared was slit to ½ inch width to be a video recording tape.

TABLE-1A

|  | Comparative example-1 | Comparative example-2 |
|---|---|---|
| Composition of magnetic layer | Single layer | Single layer |
| Layer thickness (μm) | 3.5 | 3.5 |
| Magnetic powder | $\gamma$-$Fe_2O_3$ | Co-containing iron |

TABLE-1A-continued

| | Comparative example-1 | Comparative example-2 |
|---|---|---|
| (parts/wt.) | (100) | oxide (100) |
| BET ($m^2/g$) | 25 | 45 |
| Hc (Oe) | 690 | 900 |
| Length of major axis /axis ratio | 0.35/10 | 0.20/8 |
| Binder a | Vinyl chloride-vinyl acetate copolymer | Vinyl chloride-vinyl acetate copolymer |
| (parts/wt.) | VAGH (20) | VAGH (20) |
| Binder b | Polyurethane | Polyurethane |
| (parts/wt.) | N3132 (7) (Mw = 70,000, Tg = +20° C.) | N3132 (10) (Mw = 70,000, Tg = −20° C.) |
| Binder c | Polyisocyanate | Polyisocyanate |
| (parts/wt.) | Colonate L (10) | Colonate L (10) |
| Abrasive (parts/wt.) | α-alumina (8) | α-alumina (10) |
| Average diameter of particle (μm) | 0.3 | 0.2 |
| Carbon black (parts/wt.) | 5 | 10 |
| Average diameter of particle (mμ) | 20 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1B

| | Example-1 | |
|---|---|---|
| Composition of magnetic layer | Upper layer | Lower layer |
| Layer thickness (μm) | 1.0 | 3.5 |
| Magnetic powder (parts/wt.) | Co-containing iron oxide (100) | γ-$Fe_2O_3$ (100) |
| BET ($m^2/g$) | 45 | 25 |
| Hc (Oe) | 900 | 690 |
| Length of major axis /axis ratio | 0.20/8 | 0.35/10 |
| Binder a | Vinyl chloride-vinyl acetate copolymer | Vinyl chloride-vinyl acetate copolymer |
| (parts/wt.) | VAGH (20) | VAGH (20) |
| Binder b | Polyurethane | Polyurethane |
| (parts/wt.) | N3132 (7) (Mw = 70,000, Tg = −20° C.) | N3132 (7) (Mw = 70,000, Tg = −20° C.) |
| Binder c | Polyisocyanate | Polyisocyanate |
| (parts/wt.) | Colonate L (10) | Colonate L (10) |
| Abrasive (parts/wt.) | α-alumina (10) | α-alumina (8) |
| Average diameter of particle (μm) | 0.3 | 0.2 |
| Carbon black (parts/wt.) | 10 | 5 |
| Average diameter of particle (mμ) | 20 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1C

| | Example-2 | |
|---|---|---|
| Composition of magnetic layer | Upper layer | Lower layer |
| Layer thickness (μm) | 0.6 | 3.5 |
| Magnetic powder (parts/wt.) | Co-containing iron oxide (100) | Co-containing iron oxide (100) |
| BET ($m^2/g$) | 45 | 25 |
| Hc (Oe) | 900 | 690 |
| Length of major axis /axis ratio | 0.20/8 | 0.30/10 |

TABLE-1C-continued

| | Example-2 | |
|---|---|---|
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1D

| | Example-3 | |
|---|---|---|
| Composition of magnetic layer | Upper layer | Lower layer |
| Layer thickness (μm) | 0.6 | 3.5 |
| Magnetic powder (parts/wt.) | Fe—Al metallic powder (100) | Co-containing iron oxide (100) |
| BET (m²/g) | 55 | 25 |
| Hc (Oe) | 1500 | 700 |
| Length of major axis /axis ratio | 0.18/8 | 0.35/10 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1E

| | Example-4 | |
|---|---|---|
| Composition of magnetic layer | Upper layer | Inter layer |
| Layer thickness (μm) | 0.6 | 2.0 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis /axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |

TABLE-1E-continued

| | Example-4 | |
|---|---|---|
| Abrasive (parts/wt.) | α-alumina (10) | None (0) |
| Average diameter of particle (μm) | 0.2 | — |
| Carbon black (parts/wt.) | 0.5 | 0 |
| Average diameter of particle (mμ) | 40 | 0 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1F

| | Example-4 |
|---|---|
| Composition of magnetic layer | Lower layer |
| Layer thickness (μm) | 1.0 |
| Magnetic powder (parts/wt.) | Co-containing magnetic (100) |
| BET (m²/g) | 27 |
| Hc (Oe) | 700 |
| Length of major axis /axis ratio | 0.25/10 |
| Binder a (parts/wt.) | Polyvinyl chloride MR110 (20) |
| Binder b (parts/wt.) | Polyurethane N3132 (20) (Mw = 70,000, Tg = −20° C.) |
| Binder c (parts/wt.) | Polyisocyanate Colonate L (3) |
| Abrasive (parts/wt.) | None (0) |
| Average diameter of particle (μm) | — |
| Carbon black (parts/wt.) | 3 |
| Average diameter of particle (mμ) | 15 |
| Myristic acid (parts/wt.) | 2 |
| Butyl stearate (parts/wt.) | 1 |
| Methyl ethyl ketone (parts/wt.) | 200 |
| Toluene (parts/wt.) | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1G

| | Comparative Example-3 | |
|---|---|---|
| | Upper layer | Lower layer |
| Composition of magnetic layer | | |
| Layer thickness (μm) | 0.6 | 3.5 |
| Magnetic powder (parts/wt.) | Co-containing iron oxide (100) | Co-containing iron oxide (100) |
| BET (m²/g) | 25 | 45 |
| Hc (Oe) | 900 | 690 |
| Length of major axis /axis ratio | 0.30/10 | 0.30/8 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1H

| | Comparative Example-4 | |
|---|---|---|
| Composition | Upper layer | Lower layer |

TABLE-1H-continued

| | Comparative Example-4 | |
|---|---|---|
| of magnetic layer | | |
| Layer thickness (μm) | 0.6 | 3.5 |
| Magnetic powder (parts/wt.) | Co-containing iron oxide (100) | Co-containing iron oxide (100) |
| BET (m²/g) | 45 | 45 |
| Hc (Oe) | 900 | 690 |
| Length of major axis /axis ratio | 0.20/8 | 0.20/10 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE-1I

| | Comparative Example-5 | |
|---|---|---|
| Composition of magnetic layer | Upper layer | Lower layer |
| Layer thickness (μm) | 0.6 | 3.5 |
| Magnetic powder (parts/wt.) | Co-containing iron oxide (100) | Co-containing iron oxide (100) |
| BET (m²/g) | 25 | 45 |
| Hc (Oe) | 900 | 690 |
| Length of major axis /axis ratio | 0.30/10 | 0.20/8 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1J

| Composition of magnetic layer | Comparative Example 6 | |
|---|---|---|
| | Upper layer | Lower layer |
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/ axis ratio | 0.20/8 | 0.30/10 |
| Binder a (parts/wt.) | Polyvinyl chloride MR110 (20) | Polyvinyl chloride VAGH (10) |
| Binder b (parts/wt.) | Polyurethane UR8300 (10) (MW = 70,000, Tg = +20° C.) | Polyurethane N3132 (20) (MW = 70,000, Tg = −20° C.) |

TABLE 1J-continued

| Composition | Comparative Example 6 | |
|---|---|---|
| of magnetic layer | Upper layer | Lower layer |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1K

| Composition | Comparative Example 7 | |
|---|---|---|
| of magnetic layer | Upper layer | Lower layer |
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/ axis ratio | 0.20/8 | 0.30/10 |
| Binder a (parts/wt.) | Polyvinyl chloride MR110 (20) | None (0) |
| Binder b (parts/wt.) | Polyurethane UR8300 (10) (MW = 70,000, Tg = +20° C.) | Polyurethane UR8300 (30) (MW = 70,000, Tg = +20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1L

| Composition | Comparative Example 8 | |
|---|---|---|
| of magnetic layer | Upper layer | Lower layer |
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/ axis ratio | 0.20/8 | 0.30/10 |
| Binder a (parts/wt.) | Polyvinyl chloride MR110 (20) | Polyvinyl chloride MR111 (10) |
| Binder b (parts/wt.) | Polyurethane UR8300 (10) (MW = 40,000, Tg = +20° C.) | Polyurethane N3132 (20) (MW = 70,000, Tg = −20° C.) |
| Binder c (parts/wt.) | Polyisocyanate Colonate L (10) | None (0) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1M

| Composition | Comparative Example 9 | |
|---|---|---|
| of magnetic layer | Upper layer | Lower layer |
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/ axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (MW = 40,000, Tg = +20° C.) | Polyurethane N3132 (30) (MW = 70,000, Tg = −20° C.) |
| Binder c (parts/wt.) | Polyisocyanate Colonate L (10) | Polyisocyanate Colonate L (3) |
| Abrasive (parts/wt.) | None (0) | α-alumina (10) |
| Average diameter of particle (μm) | — | 0.2 |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1N

| | (Japanese Patent O.P.I. Publication No. 56228/1938) Comparative example 10 | |
|---|---|---|
| Composition of magnetic layer | Upper layer | Lower layer |
| Layer thickness (μm) | 1 | 5 |
| Magnetic powder (parts/wt.) | Co-adsorbed-γ-Fe₂O₃ (100) | Co-adsorbed-γ-Fe₂O₃ (100) |
| BET (m²/g) | 40 | 20 |
| Hc (Oe) | 920 | 520 |
| Length of major axis/ axis ratio | | |

TABLE 1N-continued

| Composition of magnetic layer | (Japanese Patent O.P.I. Publication No. 56228/1938) Comparative example 10 | |
|---|---|---|
| | Upper layer | Lower layer |
| Binder a (parts/wt.) | Polyvinyl chloride VAGH (50) | Polyvinyl chloride VAGH (33.3) |
| Binder b (parts/wt.) | Polyurethane Estan 5702BF (MW = 130,000, Tg = −25° C.) | Polyurethane Estan 5702BF (MW = 130,000, Tg = −25° C.) |
| Binder c (parts/wt.) | Polyisocyanate Desmodur L 75 (20) | Polyisocyanate Desmodur L 75 (20) |
| Abrasive (parts/wt.) | None (0) | None (0) |
| Average diameter of particle (μm) | — | — |
| Carbon black (parts/wt.) | None | None |
| Average diameter of particle (mμ) | | |
| Myristic acid (parts/wt.) | Lecithin | Lecithin |
| Butyl stearate (parts/wt.) | | |
| Methyl ethyl ketone (parts/wt.) | 700 | 625 |
| Toluene (parts/wt.) | Cyclohexanone | Cyclohexanone |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)
Estan 5702BF (Goodrich Rubber Co.)

TABLE 1O

| Composition of magnetic layer | Example 5 | |
|---|---|---|
| | Upper layer | Lower layer |
| Layer thickness (μm) | 0.6 | 2.0 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/ axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (MW = 40,000, Tg = +20° C.) | Polyurethane N3132 (20) (MW = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1P

| Composition of magnetic layer | Example 5 | |
|---|---|---|
| | Lower layer | Upper layer |
| Layer thickness (μm) | 1.0 | 0.6 |
| Magnetic powder (parts/wt.) | Co-containing iron oxide (100) | Co-containing iron oxide (100) |
| BET (m²/g) | 27 | 45 |
| Hc (Oe) | 700 | 900 |
| Length of major axis/ axis ratio | 0.33/10 | 0.20/8 |
| Binder a (parts/wt.) | None (0) | Polyvinyl chloride MR110 (10) |
| Binder b (parts/wt.) | Polyurethane N3132 (30) (MW = 70,000, Tg = −20° C.) | Polyurethane UR8300 (10) (MW = 40,000, Tg = +20° C.) |
| Binder c (parts/wt.) | Polyisocyanate Colonate L (3) | Polyisocyanate Colonate L (10) |
| Abrasive (parts/wt.) | None (0) | α-alumina (10) |
| Average diameter of particle (μm) | — | 0.2 |
| Carbon black (parts/wt.) | 0 | 0.5 |
| Average diameter of particle (mμ) | — | 40 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1Q

| Composition of magnetic layer | Example 6 | |
|---|---|---|
| | Upper layer | Lower layer |
| Layer thickness (μm) | 2.0 | 1.0 |
| Magnetic powder (parts/wt.) | Co-containing iron oxide (100) | Co-containing iron oxide (100) |
| BET (m²/g) | 25 | 27 |
| Hc (Oe) | 690 | 700 |
| Length of major axis/ axis ratio | 0.30/10 | 0.33/10 |
| Binder a (parts/wt.) | Polyvinyl chloride MR110 (10) | None (0) |
| Binder b (parts/wt.) | Polyurethane N3132 (20) (MW = 70,000, Tg = −20° C.) | Polyurethane N3132 (30) (MW = 70,000, Tg = −20° C.) |
| Binder c (parts/wt.) | Polyisocyanate Colonate L (3) | Polyisocyanate Colonate L (3) |
| Abrasive (parts/wt.) | None (0) | None (0) |
| Average diameter of particle (μm) | — | — |
| Carbon black (parts/wt.) | 10 | 0 |
| Average diameter of particle (mμ) | 20 | — |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1R

| Composition of magnetic layer | Example 7 Upper layer | Example 7 Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 1500 | 700 |
| Length of major axis/axis ratio | 0.18/8 | 0.35/10 |
| Binder a (parts/wt.) | Polyvinyl chloride MR110 (10) | Polyvinyl chloride MR110 (10) |
| Binder b (parts/wt.) | Polyurethane UR8300 (40) (MW = 40,000, Tg = +20° C.) | Polyurethane N3132 (20) (MW = 70,000, Tg = −20° C.) |
| Binder c (parts/wt.) | Polyisocyanate Colonate L (10) | Polyisocyanate Colonate L (3) |
| Abrasive (parts/wt.) | α-alumina (10) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1S

| Composition of magnetic layer | Example 8 Upper layer | Example 8 Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (MW = 40,000, Tg = +20° C.) | Polyurethane N3132 (20) (MW = 70,000, Tg = −20° C.) |
| Binder c (parts/wt.) | Polyisocyanate Colonate L (10) | Polyisocyanate Colonate L (3) |
| Abrasive (parts/wt.) | Chromium oxide (7) | None (0) |
| Average diameter of particle (μm) | 0.3 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1T

| Composition of magnetic layer | Example 9 Upper layer | Example 9 Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 1500 | 700 |
| Length of major axis/axis ratio | 0.18/8 | 0.35/10 |
| Binder a (parts/wt.) | Polyvinyl chloride MR111 (20) | Polyvinyl chloride MR111 (10) |
| Binder b (parts/wt.) | Polyurethane UR8300 (10) (MW = 40,000, Tg = +20° C.) | Polyurethane N3132 (20) (MW = 70,000, Tg = −20° C.) |
| Binder c (parts/wt.) | Polyisocyanate Colonate L (10) | Polyisocyanate Colonate L (3) |
| Abrasive (parts/wt.) | α-alumina (8) Chromium oxide (1) | None (0) |
| Average diameter of particle (μm) | 0.2 (alumina) 0.2 (chromium oxide) | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1U

| Composition of magnetic layer | (Japanese Patent O.P.I. Publication No. 146211/1988) Comparative example 11 Upper layer | (Japanese Patent O.P.I. Publication No. 146211/1988) Comparative example 11 Lower layer |
|---|---|---|
| Layer thickness (μm) | 2.0 | 4.0 |
| Magnetic powder (parts/wt.) | Co-γ-FeOx x = 1.45 (100) | Co-γ-FeOx x = 1.45 (100) |
| BET (m²/g) | — | — |
| Hc (Oe) | 850 | 600 |
| Length of major axis/axis ratio | 0.2/— | 0.3/— |
| Binder a (parts/wt.) | Vinyl chloride/Vinyl acetate/Vinyl alcohol copolymer = 92:2:6 Degree of polymerization 700 (20) | Vinyl chloride/Vinyl acetate/Vinyl alcohol copolymer = 92:2:6 Degree of polymerization 700 (20) |
| Binder b | Polyurethane (5) | Polyurethane (5) |

TABLE 1U-continued

| Composition | (Japanese Patent O.P.I. Publication No. 146211/1988) Comparative example 11 | |
|---|---|---|
| of magnetic layer | Upper layer | Lower layer |
| (parts/wt.) Binder c (parts/wt.) | (Mw = 50,000, Tg = —) Isocyanate type hardener 75% solution Desmodur L-75 (6.7) | (Mw = 50,000, Tg = —) Isocyanate type hardener 75% solution Desmodur L-75 (6.7) |
| Abrasive (parts/wt.) | α-alumina (2) | α-alumina (2) |
| Average diameter of particle (μm) | 0.3 | 0.3 |
| Carbon black (parts/wt.) | 2 | 2 |
| Average diameter of particle (mμ) | 7 | 7 |
| Myristic acid (parts/wt.) | 1 | 1 |
| Butyl stearate (parts/wt.) | 1 | 1 |
| Methyl ethyl ketone (parts/wt.) | Oleic acid-denatured silicone | Oleic acid-denatured silicone |
| Toluene (parts/wt.) | Proper quantity of solvent | Proper quantity of solvent |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1V

| Composition | (Japanese Patent O.P.I. Publication No. 146211/1988) Comparative example 12) | |
|---|---|---|
| of magnetic layer | Upper layer | Lower layer |
| Layer thickness (μm) | 2.0 | 4.0 |
| Magnetic powder (parts/wt.) | Co-γ-FeOx x = 1.45 (100) | Co-γ-FeOx x = 1.45 (100) |
| BET (m²/g) | — | — |
| Hc (Oe) | 850 | 600 |
| Length of major axis/ axis ratio | 0.2/— | 0.3/— |
| Binder a (parts/wt.) | Vinyl chloride/Vinyl acetate/Vinyl alcohol copolymer = 92:2:6 Degree of polymerization 700 (20) | Vinyl chloride/Vinyl acetate/Vinyl alcohol copolymer = 92:2:6 Degree of polymerization 700 (20) |
| Binder b (parts/wt.) | Polyurethane (5) (Mw = 50,000, Tg = —) | Polyurethane (5) (Mw = 50,000, Tg = —) |
| Binder c (parts/wt.) | None (0) | None (0) |
| Abrasive (parts/wt.) | α-alumina (2) | α-alumina (2) |
| Average diameter of particle (μm) | 0.3 | 0.3 |
| Carbon black (parts/wt.) | 2 | 2 |
| Average diameter of particle (mμ) | 7 | 7 |
| Myristic acid (parts/wt.) | 1 | 1 |
| Butyl stearate (parts/wt.) | 1 | 1 |
| Methyl ethyl ketone (parts/wt.) | Oleic acid-denatured silicone | Oleic acid-denatured silicone |
| Toluene (parts/wt.) | Proper quantity of solvent | Proper quantity of solvent |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1W

| | (Japanese Patent O.P.I. Publication No. 146211/1988) Comparative example-13 | |
|---|---|---|
| Composition of magnetic layer | Upper layer | Lower layer |
| Layer thickness (μm) | 2.0 | 4.0 |
| Magnetic powder (parts/wt.) | Co—γ—FeOx x = 1.45 (100) | Co—γ—FeOx x = 1.45 (100) |
| BET (m²/g) | — | — |
| Hc (Oe) | 850 | 600 |
| Length of major axis/ axis ratio | 0.2/— | 0.3/— |
| Binder a (parts/wt.) | Vinyl chloride/ Vinyl acetate/ Vinyl alcohol copolymer = 92:2:6 Degree of polymerization 700 (20) | Vinyl chloride/ Vinyl acetate/ Vinyl alcohol copolymer = 92:2:6 Degree of polymerization 700 (20) |
| Binder b (parts. wt.) | Polyurethane (5) (Mw = 50,000, | Polyurethane (5) (Mw = 50,000, |

TABLE 1W-continued (Japanese Patent O.P.I. Publication No. 146211/1988) Comparative example-13

|  | | |
|---|---|---|
|  | Tg = — | Tg = — |
| Binder c (parts/wt.) | Isocyanate type hardener 75% solution Desmodur L-75 (6.7) | None (0) |
| Abrasive (parts/wt.) | α-alumina (2) | α-alumina (2) |
| Average diameter of particle (μm) | 0.3 | 0.3 |
| Carbon black (parts/wt.) | 2 | 2 |
| Average diameter of particle (mμ) | 7 | 7 |
| Myristic acid (parts/wt.) | 1 | 1 |
| Butyl stearate (parts/wt.) | 1 | 1 |
| Methyl ethyl ketone (parts/wt.) | Oleic acid-denatured silicone | Oleic acid-denatured silicone |
| Toluene (parts/wt.) | Proper quantity of solvent | Proper quantity of solvent |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1X

Example 10

| Composition of magnetic layer | Upper layer | Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (5) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1Y

Example 11

| Composition of magnetic layer | Upper layer | Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/axis ratio | 0.20/8 | 0.30/10 |

TABLE 1Y-continued

Example 11

| | | |
|---|---|---|
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (4) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1Z

Example 12

| Composition of magnetic layer | Upper layer | Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/axis ratio | 0.20/8 | 0.30/10 |
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (15) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

TABLE 1Z'

Example 13

| Composition of magnetic layer | Upper layer | Lower layer |
|---|---|---|
| Layer thickness (μm) | 0.6 | 3.5 |
| Magnetic powder (parts/wt.) | Co-containing iron oxide (100) | Co-containing iron oxide (100) |
| BET (m²/g) | 45 | 25 |
| Hc (Oe) | 900 | 690 |
| Length of major axis/axis ratio | 0.20/8 | 0.30/10 |

TABLE 1Z'-continued

|  | Example 13 |  |
|---|---|---|
| Binder a (parts/wt.) | Polyvinyl chloride MR110 (20) | Polyvinyl chloride MR110 (10) |
| Binder b (parts/wt.) | Polyurethane UR8300 (10) (Mw = 40,000, Tg = +20° C.) | Polyurethane N3132 (20) (Mw = 70,000, Tg = −20° C.) |
| Binder c (parts/wt.) | Polyisocyanate Colonate L (10) | Polyisocyanate Colonate L (3) |
| Abrasive (parts/wt.) | α-alumina (20) | None (0) |
| Average diameter of particle (μm) | 0.2 | — |
| Carbon black (parts/wt.) | 0.5 | 10 |
| Average diameter of particle (mμ) | 40 | 20 |
| Myristic acid (parts/wt.) | 2 | 2 |
| Butyl stearate (parts/wt.) | 1 | 1 |
| Methyl ethyl ketone (parts/wt.) | 200 | 200 |
| Toluene (parts/wt.) | 200 | 200 |

(Note)
N3132 (Polyurethane resin manufactured by Nippon Polyurethane Industrial Company)
VAGH (Vinyl chloride-vinyl acetate copolymer manufactured by UCC Company)
UR8300 (Polyurethane resin containing sodium sulfonate group manufactured by Toyobohseki Company)
MR110 (Polyvinyl chloride resin containing potassium sulfonate group manufactured by Nippon Zeon Company)

Each tape mentioned above was measured in terms of its electric characteristics, dropout, still-frame durability, Young's modulus, stiffness and running smoothness and edge damage by the following method.

RF Output (RF)

By using a VTR deck for measurement of RF output, RF output at 4 MHz was measured The value after 100 times of reproductions was illustrated. Note that the value of Ex. 1 is defined as the standard value, 0 dB.

Chroma Output (C-output): ditto.

Lumi-S/N (L-S/N)

For measurement, a noisemeter 925 D/I manufactured by Shiba-soku Corp. was used. Note that the value of Ex. 1 is defined as the standard value, 0 dB. High-pass filter was at 4.2 MHz and low-pass filter was at 10 KHz. As a VTR, HR-D manufactured by JVC was used.

Chroma S/N (C-S/N): ditto.

Dropout

For this measurement, VTR dropout counter, manufactured by Shiba-soku Corp., was used.

Rubbing Noise (i) With running the tape, reproduction was done to measure the system noise by a spectrum analyzer. (ii) A sample tape was subjected 10 times to the reproduction for the period of one minute to measure the rubbing noise by a spectrum analyzer. (iii) The average noise value for 10 passes at around 8 MHz noise level was read on the base 0 dB of a system noise.

Still-frame Durability

The time required for the reproduction output of the still image to drop by 2 dB was indicated by a unit of a minute.

Running Test

A sample tape was subjected to running on a VTR deck 50 times continuously under the conditions of 40° C. and the humidity of 80% to measure the decrease of RF output.

Edge Damage

The condition of a tape edge after being slit was checked in terms of the existence of damage.

Adhesion Test

A cellophane adhesive tape was applied on the magnetic surface, and after one hour, the tape was peeled off to check how the magnetic layer was caused to come off.

|  | Adhesivity | |
|---|---|---|
|  | Between support and lower layer | Between upper layer and lower layer |
| Whole magnetic layer comes off to cause support to be seen | Unacceptable | Unacceptable |
| Lower magnetic layer stays. | Acceptable | Unacceptable |
| Both of upper and lower layer stay. | Acceptable | Acceptable |

The results are shown in Tables 2A-2D.

TABLE 2A

|  | Comp. Ex.-1 | Comp. Ex.-2 | Ex.-1 | Ex.-2 |
|---|---|---|---|---|
| Electromagnetic conversion characteristics | | | | |
| RF (dB) | −1.5 | −0.2 | 0 | +2.0 |
| C-Output (dB) | −0.4 | −0.5 | 0 | +1.3 |
| L-S/N (dB) | −2.5 | 0 | 0 | +1.9 |
| C-S/N (dB) | −2.1 | −0.1 | 0 | +1.8 |
| Dropout | | | | |
| 10 μs/-14 dB Number | 30 | 19 | 5 | 0 |
| Rubbing noise (dB) | +4.1 | +7.2 | +2.1 | +0.9 |
| Still-frame durability | | | | |
| death time (min) | 40 | 15 | >120 | >120 |
| Running test | | | | |
| (40° C., 80%, 50 pass) RF output drop (dB) | −1.5 | −1.8 | −0.8 | −1.0 |
| Edge damage | Yes | Yes | None | None |
| Physical properties | | | | |
| Surface roughness (μm) (Cutoff value 0.25μ) | 0.020 | 0.018 | 0.015 | 0.011 |
| Adhesive property | | | | |
| Between base and lower layer | Poor | Poor | Fine | Fine |
| Between upper layer and lower layer | — | — | Fine | Fine |
| Young's modulus (kg/mm²) | 530 | 450 | 510 | 530 |

TABLE 2B

|  | Ex.-3 | Ex.-4 | Comp. Ex.-3 | Comp. Ex.-4 |
|---|---|---|---|---|
| Electromagnetic conversion characteristics | | | | |
| RF (dB) | +4.0 | +2.2 | −1.8 | +1.8 |
| C-Output (dB) | +2.1 | +1.9 | −0.6 | +1.1 |
| L-S/N (dB) | +3.5 | +1.8 | −2.9 | −1.5 |
| C-S/N (dB) | +2.2 | +2.0 | −2.3 | +1.7 |
| Dropout | | | | |
| 10 μs/-14 dB Number | 2 | 1 | 19 | 39 |
| Rubbing noise (dB) | +1.3 | +0.8 | +2.8 | +4.8 |
| Still-frame durability | | | | |
| death time (min) | >120 | >120 | 50 | 62 |
| Running test | | | | |

TABLE 2B-continued

|  | Ex.-3 | Ex.-4 | Comp. Ex.-3 | Comp. Ex.-4 |
|---|---|---|---|---|
| (40° C., 80%, 50 pass) RF output drop (dB) | −1.1 | −1.2 | −1.8 | −2.8 |
| Edge damage | None | None | Yes | Yes |
| Physical properties |  |  |  |  |
| Surface roughness (μm) (Cutoff value 0.25μ) | 0.009 | 0.010 | 0.023 | 0.014 |
| Adhesive property |  |  |  |  |
| Between base and lower layer | Fine | Fine | Fine | Poor |
| Between upper layer and lower layer | Fine | Fine | Poor | Poor |
| Young's modulus (kg/mm²) | 590 | 580 | 620 | 390 |

TABLE 2C

|  | Comp. Ex.-5 | Comp. Ex.-6 | Comp. Ex.-7 | Comp. Ex.-8 |
|---|---|---|---|---|
| Electromagnetic conversion characteristics |  |  |  |  |
| RF (dB) | −1.3 | −0.6 | −0.4 | −0.2 |
| C-Output (dB) | −1.0 | −0.3 | −0.1 | −0.3 |
| L-S/N (dB) | −1.5 | −1.1 | −0.6 | −0.4 |
| C-S/N (dB) | −1.8 | −0.5 | −0.1 | −0.1 |
| Dropout |  |  |  |  |
| 10 μs/-14 dB Number | 49 | 58 | 39 | 29 |
| Rubbing noise (dB) | +1.8 | +2.3 | +2.9 | +2.4 |
| Still-frame durability |  |  |  |  |
| death time (min) | 80 | 70 | 42 | 51 |
| Running test |  |  |  |  |
| (40° C., 80%, 50 pass) RF output drop (dB) | −1.9 | −1.8 | −2.5 | −3.1 |
| Edge damage | Yes | Yes | Yes | Yes |
| Physical properties |  |  |  |  |
| Surface roughness (μm) (Cutoff value 0.25μ) | 0.019 | 0.014 | 0.013 | 0.013 |
| Adhesive property |  |  |  |  |
| Between base and lower layer | Poor | Fine | Fine | Fine |
| Between upper layer and lower layer | Poor | Poor | Poor | Poor |

TABLE 2C-continued

|  | Comp. Ex.-5 | Comp. Ex.-6 | Comp. Ex.-7 | Comp. Ex.-8 |
|---|---|---|---|---|
| Young's modulus (kg/mm²) | 370 | 430 | 280 | 320 |

TABLE 2D

|  | Comp. Ex.-9 | Comp. Ex.-10 |
|---|---|---|
| Electromagnetic conversion characteristics |  |  |
| RF (dB) | −1.1 | −2.1 |
| C-Output (dB) | −0.1 | −2.5 |
| L-S/N (dB) | −0.9 | −2.1 |
| C-S/N (dB) | −0.6 | −3.1 |
| Dropout |  |  |
| 10 μs/-14 dB Number | 21 | 19 |
| Rubbing noise (dB) | +6.0 | +5.1 |
| Still-frame durability |  |  |
| death time (min) | 1 | 1 |
| Running test |  |  |
| (40° C., 80%, 50 pass) RF output drop (dB) | −5.9 | −6.9 |
| Edge damage | Yes | Yes |
| Physical properties |  |  |
| Surface roughness (μm) (Cutoff value 0.25μ) | 0.010 | 0.021 |
| Adhesive property |  |  |
| Between base and lower layer | Fine | Fine |
| Between upper layer and lower layer | Poor | Poor |
| Young's modulus (kg/mm²) | 480 | 430 |

TABLE 2E

|  | Ex.-5 | Ex.-6 | Ex.-7 | Ex.-8 |
|---|---|---|---|---|
| Electromagnetic conversion characteristics |  |  |  |  |
| RF (dB) | +1.8 | +1.6 | +2.1 | +1.8 |
| C-Output (dB) | +1.1 | +1.0 | +1.5 | +1.4 |
| L-S/N (dB) | +1.6 | +1.4 | +1.7 | +1.5 |
| C-S/N (dB) | +1.6 | +1.5 | +2.2 | +2.1 |
| Dropout |  |  |  |  |
| 10 μs/-14 dB Number | 1 | 0 | 0 | 1 |
| Rubbing noise (dB) | +1.0 | +1.2 | +1.2 | +1.1 |
| Still-frame durability |  |  |  |  |
| death time (min) | >120 | >120 | >120 | >120 |
| Running test |  |  |  |  |
| (40° C., 80%, 50 pass) RF output drop (dB) | −1.3 | −1.2 | −1.1 | −0.8 |
| Edge damage | None | None | None | None |
| Physical properties |  |  |  |  |
| Surface roughness (μm) (Cutoff value 0.25μ) | 0.011 | 0.010 | 0.009 | 0.010 |
| Adhesive property |  |  |  |  |
| Between base and lower layer | Fine | Fine | Fine | Fine |
| Between upper layer and lower layer | Fine | Fine | Fine | Fine |

TABLE 2F

|  | Ex.-9 | Ex.-10 | Ex.-11 | Ex.-12 |
|---|---|---|---|---|
| Electromagnetic conversion characteristics |  |  |  |  |
| RF (dB) | +1.6 | −0.5 | −1.0 | −0.7 |
| C-Output (dB) | +1.2 | −0.2 | −0.6 | −0.9 |
| L-S/N (dB) | +1.3 | −0.9 | −1.1 | −0.8 |

TABLE 2F-continued

|  | Ex.-9 | Ex.-10 | Ex.-11 | Ex.-12 |
|---|---|---|---|---|
| C-S/N (dB) | +1.6 | −0.5 | −1.0 | −0.7 |
| Dropout | | | | |
| 10 μs/-14 dB Number | 1 | 14 | 12 | 9 |
| Rubbing noise (dB) | +1.3 | +5.1 | +4.9 | +6.2 |
| Still-frame durability | | | | |
| death time (min) | >120 | 15 | 7 | 6 |
| Running test | | | | |
| (40° C., 80%, 50 pass) | −1.2 | −4.2 | −4.0 | −5.1 |
| RF output drop (dB) | | | | |
| Edge damage | None | Yes | Yes | Yes |
| Physical properties | | | | |
| Surface roughness (μm) (Cutoff value 0.25μ) | 0.011 | 0.014 | 0.015 | 0.017 |
| Adhesive property | | | | |
| Between base and lower layer | Fine | Poor | Fine | Fine |
| Between upper layer and lower layer | Fine | Poor | Poor | Poor |

TABLE 2G

|  | Ex.-10 | Ex.-11 | Ex.-12 | Ex.-13 |
|---|---|---|---|---|
| Electromagnetic conversion characteristics | | | | |
| RF (dB) | +1.0 | +1.5 | +1.8 | +1.7 |
| C-Output (dB) | +1.2 | +1.3 | +1.2 | +1.1 |
| L-S/N (dB) | +1.6 | +1.7 | +1.6 | +1.4 |
| C-S/N (dB) | +1.5 | +1.6 | +1.5 | +1.4 |
| Dropout | | | | |
| 10 μs/-14 dB Number | 2 | 2 | 2 | 3 |
| Rubbing noise (dB) | +1.2 | +2.5 | +1.9 | +2.3 |
| Still-frame durability | | | | |
| death time (min) | >120 | >120 | >120 | >120 |
| Running test | | | | |
| (40° C., 80%, 50 pass) | −1.4 | −1.5 | −1.6 | −1.7 |
| RF output drop (dB) | | | | |
| Edge damage | None | None | None | None |
| Physical properties | | | | |
| Surface roughness (μm) (Cutoff value 0.25μ) | 0.012 | 0.011 | 0.013 | 0.013 |
| Adhesive property | | | | |
| Between base and lower layer | Fine | Fine | Fine | Fine |
| Between upper layer and lower layer | Fine | Fine | Fine | Fine |

From the results shown in Table 2A-2D, it can be understood that the quality of tape improves as indicated in the following (1)-(7) by composing magnetic tape according to the present invention.

(1) In Comp. Exs. 1 and 2 where the magnetic layer is single, almost all of the properties such as the electromagnetic conversion characteristics, dropout, the rubbing noise, and the like can not be improved. To the contrary, all properties can be improved by plural layers arranged according to the present invention, as shown in Exs. 1, 2, 3, 4, 5, 6, and 7.

Figure 6:
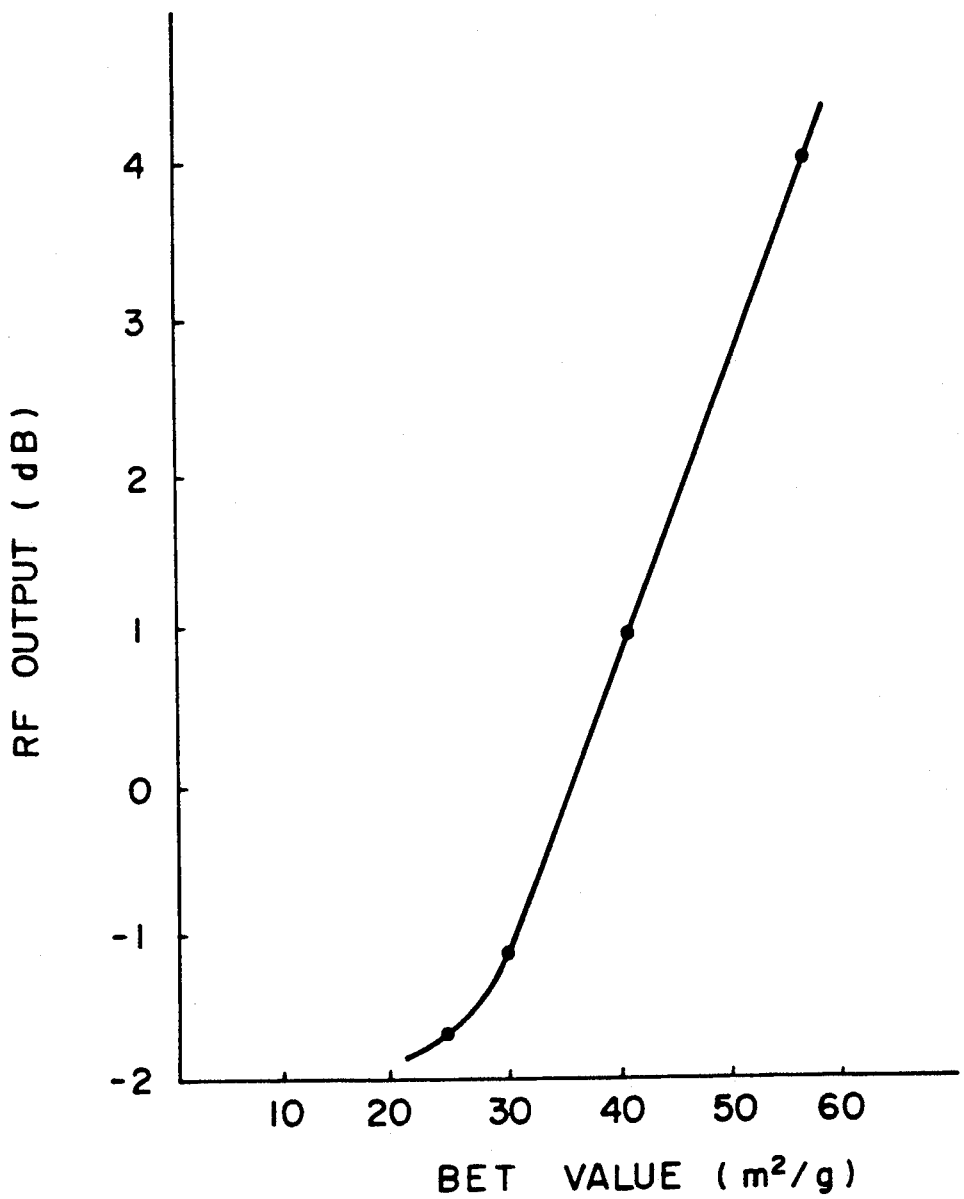
FIG. 6 is a graph which shows the change of the characteristic of RF output caused by the change of BET value of the magnetic powder.
Figure 7:
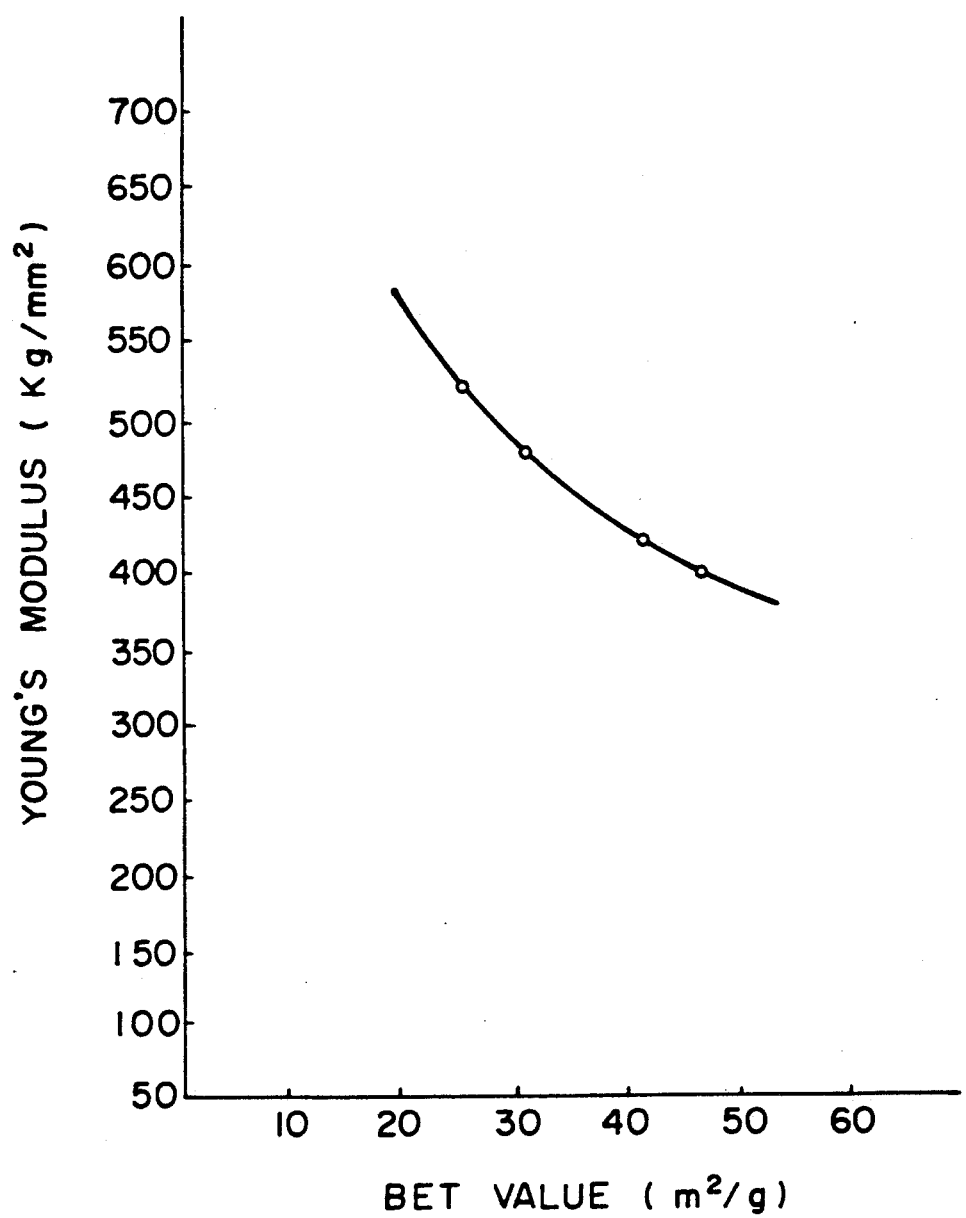
FIG. 7 is a graph which shows the change of Young's modulus caused by the change of BET value of the magnetic powder.

(2) As for BET value, Comp. Ex. 3 containing a magnetic powder having a smaller BET value, which is out of the present invention, in the upper layer shows inefficient electromagnetic conversion characteristics, dropout. Comp. Ex. 4 containing a lower layer magnetic powder having a large BET value shows inferiority in the rubbing noise, adhesive strength, strength of the layer. Therefore, it can be understood that BET value of magnetic powder for the upper layer should not less than 30 m²/g and that for the lower layer should be less than 30 m²/g. FIG. 6 illustrates the variation of RF output on each example when BET is changed, where BET value of the lower layer magnetic powder is fixed at 25 m²/g. FIG. 7 illustrates the variation of Young's modulus according to the change of BET value of the lower layer magnetic powder, where BET value of the upper layer magnetic powder is fixed at 45 m²/g.

(3) As for the binders used in the upper magnetic layer and the lower magnetic layer, when the same kind of binders are used according to the present invention, the electromagnetic conversion characteristics, dropout, and the like are improved. However, in Comp. Exs. 6, 7, and 8 where the binders are not the same, all of them are inferior in efficiency.

(4) Abrasive should be contained at least in the upper layer according to the present invention. When it is not contained in the upper layer, the recording medium is inferior in the electromagnetic conversion characteristics, dropout, the rubbing noise, and durability of the layer as shown in Comp. Exs. 9 and 10. Comp. Ex. 10 is cited from the above-mentioned Japanese Patent Open to Public Inspection No. 56228/1983, where abrasive is not contained in both of the upper layer and the lower layer. The efficiency of its electromagnetic conversion characteristics becomes worse.

(5) As shown in Exs. 8 and 9, the materials of the abrasive can be $Cr_3O_3$ or its mixture with α-alumina, where the abrasive is satisfactorily effective.

(6) In Comp. Exs. 11, 12, and 13 which are cited from Japanese Patent Publication Open to Public Inspection No. 146211/1988, abrasive is contained in both the upper layer and the lower layer, but the content (especially the content of abrasive in the upper layer) is 2 parts by weight. The content is too low. As a result, it leads to a drop of RF output, an increase of the rubbing noise, and a decrease of still-image durability. On the other hand, when not less than 3 parts by weight of abrasive, furthermore not less than 5 parts by weight of abrasive is contained in the layers, its efficiency is greatly improved as shown in Exs. 2, 3, 10, and 11. FIG. 8 illustrates the change of the rubbing noise influenced by the content of the abrasive in the upper layer where the content of the abrasive is changed in the recipe of Ex. 2. In Comp. Ex. 13, the binders of the upper layer and that of the lower layer are different from each other. Therefore, the electromagnetic conversion characteristics, the rubbing noise, and durability of the layer become worse. In the case of Comp. Exs. 11, 12, and 13, the particle diameter of carbonblack used in the lower layer is 7 mμ. It is comparatively small and small particles are not preferable to improve durability of the layer, the rubbing noise, dropout, and the like.

(7) In the case of Comp. Exs. 11, 12, and 13, the efficiency does not reach the required level. The reason is considered to be that not only the content of abrasive is too low but also BET values of the upper layer and the lower layer are not adequately chosen.

What is claimed is:

1. A magnetic recording medium comprising a nonmagnetic support having provided thereon an upper magnetic layer positioned further from said support, and a lower magnetic layer positioned closer to said support, wherein said upper magnetic layer comprises a first binder, a magnetic powder having an original BET specific surface area of not less than 30 m$^2$/g and at least one abrasive from the group consisting of alumina, silicon carbide, Cr$_2$O$_3$, silica, α-Fe$_2$O$_3$, TiO$_2$, and zirconia in a ratio of 3 to 20 parts per 100 parts by weight of said magnetic powder, and said lower magnetic layer comprises a second binder and a magnetic powder having an original BET specific surface area of less than 30 m$^2$/g, said first and second binder each containing a mixture of polyurethane resin and polyvinyl chloride resin, at least one of the resins contained in each said upper and lower layer having a —SO$_3$M group, in which M is hydrogen, lithium, sodium, or potassium.

2. The medium of claim 1, wherein said magnetic powder contained in said upper layer has an original BET specific surface area of from 45 m$^2$/g to 70 m$^2$/g.

3. The medium of claim 2, wherein said magnetic powder contained in said upper layer has an original BET specific surface area of from 50 m$^2$/g to 70 m$^2$/g.

4. The medium of claim 1, wherein said magnetic powder contained in said lower layer has an original BET specific surface area of from 20 m$^2$/g to 29 m$^2$/g.

5. The medium of claim 4, wherein said magnetic powder contained in said lower layer has an original BET specific surface area of from 25 m$^2$/g to 29 m$^2$/g 6. The medium of claim 1, wherein said magnetic powder contained in said upper layer has an average major axis size of from 0.10 μm to 0.25 μm.

7. The medium of claim 1, wherein said magnetic powder contained in said upper layer has an average axis ratio of from 7 to 9.

8. The medium of claim 1, wherein said magnetic powder contained in said lower layer has an average major axis size of from 0.25 μm to 0.40 μm.

9. The medium of claim 1, wherein said magnetic powder contained in said lower layer has an average axis ratio of from 9 to 12.

10. The medium of claim 1, wherein said abrasive each has a particle size of not more than 0.6 μm.

11. The medium of claim 1, wherein said magnetic powders each contained said upper layer and said lower layer are a ferromagnetic metal powder, a γ-FeO$_3$ powder, a Co-containing γ-Fe$_2$O$_3$ powder, a Fe$_3$O$_4$ powder, a Co-containing Fe$_3$O$_4$ powder, a Co-containing FeOx powder, in which $4/3 \leq x \leq 3/2$, or a CrO$_2$ powder.

12. The medium of claim 1, wherein said upper magnetic layer has a thickness of not more than 1.0 μm and said lower magnetic layer has a thickness of from 1.5 μm to 4.0 μm.

13. The medium of claim 1, wherein said upper magnetic layer has a thickness of from 0.3 μm to 1.0 μm and said lower magnetic layer has a thickness of from 2.0 μm to 3.5 μm.

14. A magnetic recording medium comprising a nonmagnetic support having an upper magnetic layer thereon positioned farther from said support and a lower magnetic layer positioned closer to said support, wherein said upper magnetic layer comprises a first binder, a magnetic powder having an average major axis of 0.10 μm to 0.25 μm, and at least one abrasive selected from the group consisting of alumina, silicon carbide, Cr$_2$O$_3$, silica, α-Fe$_2$O$_3$, TiO$_2$, and zirconia, in a ratio of 3 to 20 parts per 100 parts by weight of said magnetic powder, and said lower magnetic layer comprises a second binder and a magnetic powder having an average major axis of 0.25 μm to 0.4 μm, said first and second binder each containing a mixture of polyurethane resin and polyvinyl chloride resin, at least one of the resins contained in each said upper and lower layer having a —SO$_3$M group, wherein M is hydrogen, lithium, sodium, or potassium.

* * * * *